United States Patent
Heegard et al.

(10) Patent No.: US 6,993,095 B2
(45) Date of Patent: Jan. 31, 2006

(54) PHASE-LOCKED LOOP INITIALIZATION VIA CURVE-FITTING

(75) Inventors: Chris Heegard, Santa Rosa, CA (US); Peter A. Murphy, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 748 days.

(21) Appl. No.: 09/809,748

(22) Filed: Mar. 15, 2001

(65) Prior Publication Data

US 2002/0176520 A1    Nov. 28, 2002

(51) Int. Cl.
H03D 3/24    (2006.01)

(52) U.S. Cl. .................. 375/327; 375/215; 375/294; 375/373; 375/376; 375/326

(58) Field of Classification Search ............... 375/373, 375/376, 315, 294, 327, 326, 329, 344, 350, 375/325, 229, 265, 219, 137, 355; 370/203; 341/81, 50; 714/789, 795; 329/304; 327/156
See application file for complete search history.

(56) References Cited

U.S. PATENT DOCUMENTS

| | | | | |
|---|---|---|---|---|
| 5,170,415 A | * | 12/1992 | Yoshida et al. | 375/326 |
| 5,233,632 A | * | 8/1993 | Baum et al. | 375/344 |
| 5,287,067 A | * | 2/1994 | Denno et al. | 329/304 |
| 5,799,047 A | * | 8/1998 | Dobrica | 375/350 |
| 5,875,215 A | * | 2/1999 | Dobrica | 375/344 |
| 5,960,044 A | * | 9/1999 | Montreuil | 375/322 |
| 6,031,880 A | * | 2/2000 | Li et al. | 375/326 |
| 6,160,854 A | * | 12/2000 | Heegard et al. | 375/265 |
| 6,421,399 B1 | * | 7/2002 | Avidor et al. | 375/329 |
| 2002/0126748 A1 | * | 9/2002 | Rafie et al. | 375/229 |

OTHER PUBLICATIONS

Lee, Edward A. et al., "Digital Communication," Second Edition, Kluwer Academic Publishers, Boston, MA 1994, pp. 709-713.

Scharf, Louis L., "Statistical Signal Processing: Detection, Estimation, and Time Series Analysis," Addison-Wesley Publishing Company, Reading, MA 1991, PP. 360-386.

* cited by examiner

Primary Examiner—Stephen Chin
Assistant Examiner—Ted Wang
(74) Attorney, Agent, or Firm—Abdul Zindani; W. James Brady, III; Frederick J. Telecky, Jr.

(57) ABSTRACT

A method and apparatus for accurately estimating the carrier frequency offset and the carrier phase offset of a digitally modulated signal using a signal processing algorithm to initialize the state variables of a Phase-Locked Loop (PLL) is disclosed. A sequence of phase values is estimated from a received sequence of symbols and the angular effect due to the modulation format is removed from the sequence of phase values. A curve-fit algorithm based in one embodiment on the RLS algorithm is then applied to a sequence of unwrapped phase values to estimate the carrier frequency offset and the carrier phase offset.

14 Claims, 4 Drawing Sheets

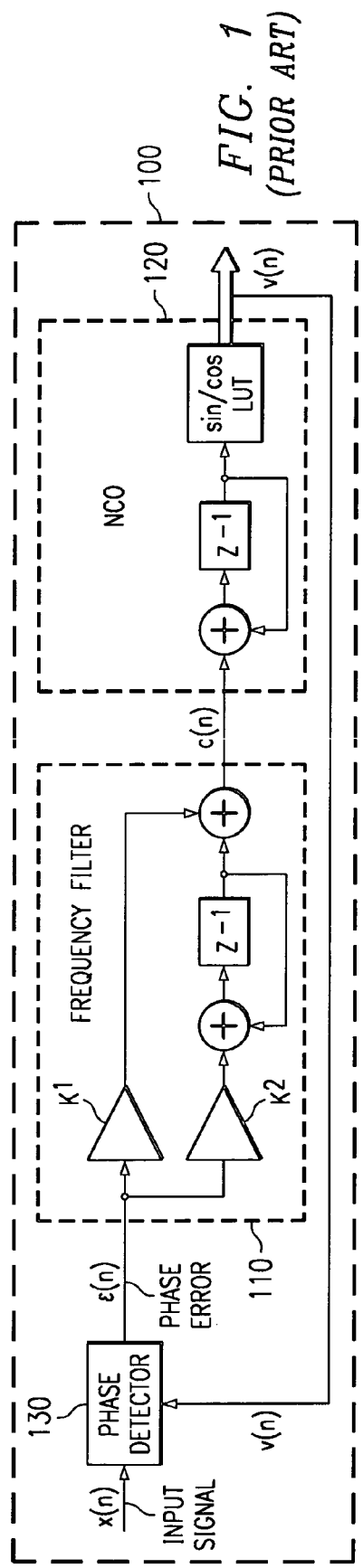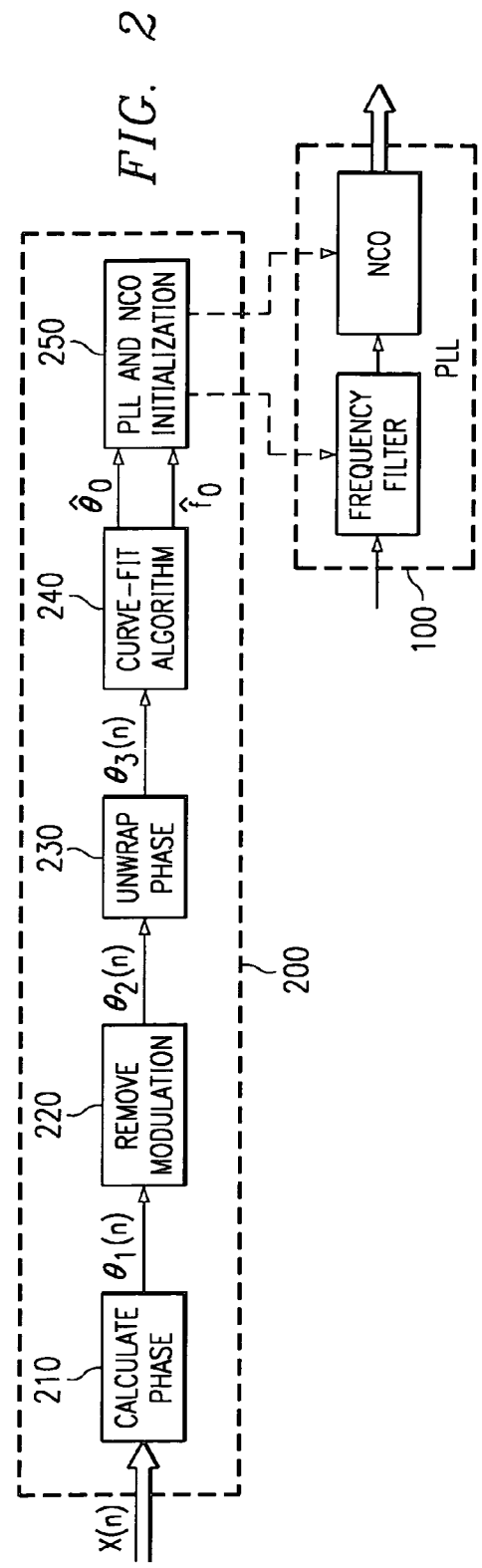

| TRANSMITTED BITS | TRANSMITTED CONSTELLATION POINT | RECEIVED CONSTELLATION POINT | $\theta_1$(DEG) | $\theta_2$(DEG) | $\theta_3$(DEG) |
|---|---|---|---|---|---|
| 0 | 1+0j | 0.707+0.707j | 45 | 45 | 45 |
| 1 | −1+0j | 0−j | −90 | 90 | 90 |
| 0 | 1+0j | 0.707(−1+j) | 135 | 135 | 135 |
| 0 | 1+0j | −1+0j | 180 | 180 | 180 |
| 1 | −1+0j | 0.707(1+j) | 45 | −135 | 225 |
| 0 | 1+0j | 0−j | −90 | −90 | 270 |

PHASE-LOCKED LOOP INITIALIZATION VIA CURVE-FITTING

BACKGROUND OF THE INVENTION

Coherent demodulation of digitally modulated signals requires a receiver to be synchronized to the carrier frequency offset and carrier phase offset of the received signal relative to the transmitted signal. If left uncorrected, the carrier frequency offset at the receiver may rotate the transmitted signal constellation, which introduces errors each time a received symbol rotates past the boundary of a decision region. The carrier phase offset may also introduce a fixed rotation to the transmitted constellation, which causes errors due to the misalignment of the decision regions at the receiver relative to the transmitter.

Generally, in the prior art, receivers employ a phase-locked loop (PLL) to acquire and track carrier frequency offsets and carrier phase offsets. During an initialization period, the PLL locks onto the carrier frequency offset and carrier phase offset. Following this period, the PLL tracks these two parameters.

For continuous transmission systems, the acquisition period has an insignificant effect on data throughput because the acquisition period is only required once during the entire transmission interval. However, in packet-based systems, the acquisition period can have a negative impact on data throughput because each packet requires an acquisition phase.

For the foregoing reasons there is a need for improved signal processing methods that may quickly and accurately estimate the initial values of the state variables of a phase-locked loop, thereby reducing the acquisition period. The present invention provides methods and apparatus that meet the aforementioned need.

SUMMARY OF THE INVENTION

The present invention provides methods and apparatus for initializing a phase-locked loop using a signal processing algorithm.

In one embodiment of the invention, a method for estimating carrier frequency offset and carrier phase offset is disclosed. The method comprises the steps of (1) estimating phases of a sequence of digitally modulated symbols; (2) removing from each of the estimated phases an angle rotation introduced by a modulation format, wherein the phase rotation is computed based on a reference symbol; (3) deriving a set of values from the estimated phases after removal of said angle rotation, wherein the set of values are a function of the carrier frequency and phase offsets to be estimated; and (4) processing the set of values to determine estimates of the carrier frequency and phase offsets. In this embodiment, the carrier frequency offset and carrier phase offset are used to initialize a Phase-Locked Loop (PLL).

In another embodiment, apparatus is provided for estimating the carrier phase offset and the carrier frequency offset. The apparatus comprises (1) a phase calculator for estimating phases of a sequence of digitally modulated symbols; (2) a remove modulation module for removing an angle rotation introduced by a modulation format to generate a sequence of phase values representative of the carrier frequency offset and the carrier phase offset; and (3) an estimation module for estimating the carrier frequency offset and the carrier phase offset, whereby the estimation module applies a curve-fitting algorithm to the sequence of phase values to generate a linear function dependent on the carrier frequency offset and the carrier phase offset. In yet another embodiment, the apparatus further comprises an unwrap module for modifying the phase estimates generated by the phase calculator module.

These and other features and objects of the invention will be more fully understood from the following detailed description of the preferred embodiments, which should be read in light of the accompanying drawings.

BRIEF DESCRIPTION OF THE DRAWINGS

FIG. 1 is a block diagram of a prior art second-order Phase Lock Loop (PLL);

FIG. 2 is a block diagram of a PLL initialization module in accordance with the invention;

DETAILED DESCRIPTION OF THE INVENTION

Figure 3A:
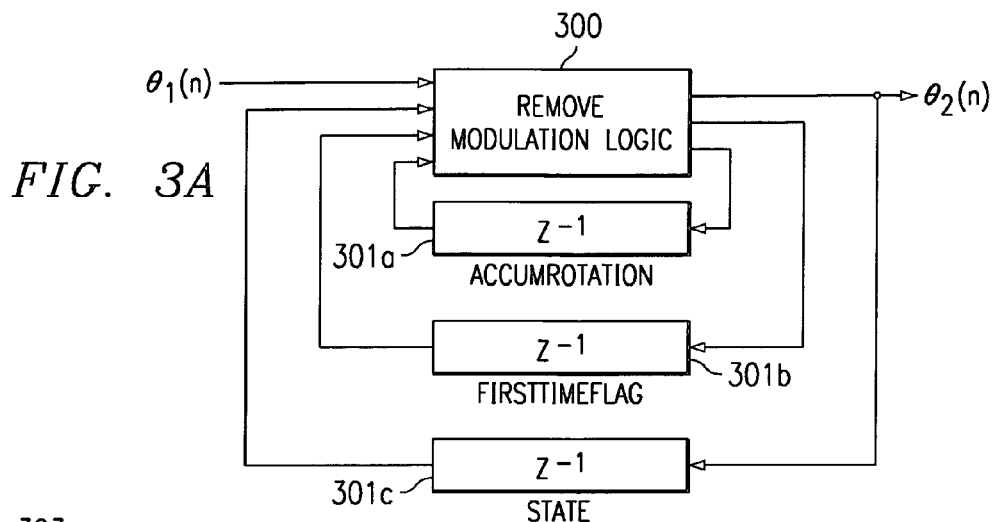
FIGS. 3A and 3B are a block diagram and flowchart, respectively, illustrating a remove modulation module.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings in general and FIGS. 1 through 6 in particular, the method and apparatus of the present invention are disclosed.

FIG. 1 illustrates the basic structure of a phase-locked loop (PLL) 100 in block diagram form. A Numerically-Controlled Oscillator (NCO) 120 generates a signal v(n) which tracks the phase of the input signal x(n). The output of the NCO 120 is controlled by a control signal c(n) generated by a loop filter. The frequency of the output signal v(n) is varied according to the signal c(n). As illustrated in FIG. 1, the NCO can be implemented with an integrator and a sinusoidal signal generator. Methods for implementing a voltage or numerically controlled oscillator are well-known to those skilled in the art, and various well known implementations other than that illustrated in FIG. 1 can be substituted therefor.

A phase match is measured by the phase error signal $\epsilon(n)$ computed by the phase detector 130 from the two signals x(n) and v(n), as illustrated in FIG. 1. The phase detector 130 can be implemented, for example, with a mixer followed by a low-pass-filter whose output is related to the phase differential between the two input signals. Other methods for implementing the phase detector may also be used.

A loop filter represented herein as frequency filter 110 filters the error signal $\epsilon(n)$ to generate a control signal c(n) which is used by the NCO 120 to generate its output v(n). The loop filter 110 can be realized as a proportional control characterized by a gain (constant $K_1$). Alternatively, the frequency filter 110 can be realized as a proportional and integrate (PI) control, as is the case in FIG. 1. Other methods for implementing the loop filter 110 may be used as well. The PLL 100 of FIG. 1 can be associated with a transfer function that links the phase of the input signal x(n) to the phase of the output signal v(n).

The exemplary PLL 100 is characterized by a transfer function having quadratic terms (second-order PLL). As known in control theory, an nth order loop can be described by n state variables whose future values can be predicted from their initial values if the input of the loop is known. For a second-order PLL, the two state variables may be the carrier phase offset and the carrier frequency offset whose initial values are estimated, and are then brought to their steady-state values during the acquisition phase.

In an initial operation of the PLL 100, as performed in the prior art, a reference signal having a frequency within the bandwidth of the transfer function is used by the NCO 120 to lock to the frequency of the input signal. The reference signal is initialized by an initial carrier frequency offset $_0$ and an initial carrier phase offset $\theta_0$ which will be represented by the pair $(_0, \theta_0)$. In accordance with the principles of the present invention, the pair $(_0, \theta_0)$ is computed using signal processing methods as described below in accordance with FIG. 2.

FIG. 2 illustrates a method for initializing the PLL 100. The PLL initialization module 200 takes as input a sequence of digitally modulated symbols and generates the pair $(_0, \theta_0)$ which is passed to the PLL and NCO initialization module 250 to generate the reference signal for use by the PLL 100. As illustrated in FIG. 2, a calculate phase module 210 takes as input a digitally modulated symbol x(n) and estimates a phase $\theta_1(n)$ of the symbol x(n). For example, from a symbol $\chi(n)=1/\sqrt{2}+i\,1/\sqrt{2}$ drawn from a BPSK constellation, the calculate phase module 210 would generate a phase estimate $\theta_1(n)$ equal to 45°. The table 500 of FIG. 5, discussed in greater detail hereinafter, provides an example mapping between symbol x(n) (column 506) and phase $\theta_1(n)$ (column 508). The phase estimate may be expressed in degrees, radians or any other scaled version of degrees or radians.

In one embodiment, the output of the calculate phase module 210 is expressed in degrees and is in the interval [−180,180]. Alternatively, the output may be in the interval [0,360].

A remove modulation module 220 removes the angle rotation effect introduced by the underlying modulation format to generate a phase estimate $\theta_2(n)$ which depends only on the carrier frequency and carrier phase offset. The operation of the remove modulation module 220 will be described in accordance with FIGS. 3A and 3B.

Referring back to FIG. 2, an unwrap module 230 unwraps the phase estimates $\theta_2(n)$ to generate a linear version $\theta_3(n)$ of $\theta_2(n)$ This module will be described in accordance with FIGS. 4A and 4B.

In accordance with one embodiment of the present invention, a curve-fitting algorithm is applied to the linear phase estimates $\theta_3(n)$ to generate an estimate of the pair $(\theta_0, f_0)$. This is accomplished by the curve-fit algorithm module 240. The curve-fit algorithm module 240 approximates the sequence of linear phase estimates $\theta_3(n)$ with a first order polynomial function related to the pair $(\theta_0, f_0)$.

In one embodiment, a recursive least-squares (RLS) method is used implement the curve-fitting method. The RLS method is thus used to approximate an observation vector y having as components the linear phase estimates $[\theta_3(0), \theta_3(1), \ldots, \theta_3(N-1)]^T$. Other algorithms such as the least-mean-square (LMS) algorithm or the Kalman filtering method may also be used.

The vector y of linear phase estimates is a vector of noisy data that can be represented as a vector $u=[u(0), u(1), \ldots, u(N-1)]^T$ plus a noise vector $t=[t(0), t(1), \ldots, t(N-1)]^T$ (i.e. y=u+t). A component u(n) can be represented by the linear equation dependent of the pair $(\theta_0, f_0)$: $u(n)=\theta_0+n*T_s*360*f_0$ where $T_s$ is the sampling period (in seconds), $\theta_0$ is in degrees, and $f_0$ is the carrier frequency offset in Hertz.

The observation vector y can also be modeled with the equation $y=H_n w+t$ where $H_n$ is an (N×2) matrix having a component $h_i$ at row i equal to $[1 \; i*360*T_s]$ for $i=0, \ldots, N-1$. w is a matrix of parameters to be estimated and is equal to $[\theta_0, f_0]^T$. A least-square solution for w is given by the equation $\hat{w}=(H_N^T \cdot H_N)^{-1} \cdot H^T \cdot y$. The estimate $\hat{w}$, which is equal to $[\theta_0, o]^T$, may be computed recursively using the RLS or Kalman filtering algorithm. Such algorithms are well known to those skilled in the art. Other methods for computing the estimate may be used as well.

The estimation of the pair $[\theta_0, o]^T$ will be described in accordance with the RLS method. The basic idea behind the RLS method is to sequentially update the least squares estimate as new measurements become available. The observation equation up to time n may be rewritten as $$\begin{bmatrix} y_1 \\ y_2 \\ \vdots \\ y_{n-1} \\ y_n \end{bmatrix} = \begin{bmatrix} H_{n-1} \\ c_n^T \end{bmatrix} \cdot w + u_n$$

where $c_n=[1 \; n*360*Ts]^T$. It can be shown that that the Least Squares (LS) estimate of w at time n (denoted by $\hat{w}_n$) can be computed recursively using the following recursions:

$\gamma_n^{-1}=1+c_n^T P_{n-1} c_n$      1.

$K_n=P_{n-1} c_n/\gamma_n^{-1}$      2.

$P_n=P_{n-1}-\gamma_n P_{n-1} c_n c_n^T P_{n-1}$      3.

$\text{err}_n=y_n-c_N^T w_{n-1}$      4.

$w_n=w_{n-1}+K_n \text{err}_n$      5.

Assuming $P_0$ is known or can be accurately estimated and since $c_n$ is deterministic, $K_N$ can be pre-computed. One approach to correctly initialize $P_0$ is to set it equal to a large diagonal matrix. As an example, letting $$P_0 = \begin{bmatrix} 1e6 & 0 \\ 0 & 1e6 \end{bmatrix}$$

and $T_s=1\,\mu s$, it can be shown that the first ten values of the 2×1 vector K are given by $K_0=[0.99900099900100, 0.00000000000000]^T$
$K_1=[0.00000000770834, 0.00277777773493]^T$
$K_2=[0.16652789131688, 0.00138865759479]^T$
$K_3=[0.19986009717343, 0.00083316678192]^T$
$K_4=[0.19988007164837, 0.00055544451064]^T$
$K_5=[0.19037646934006, 0.00039674985045]^T$
$K_6=[0.17848855883573, 0.00029756592596]^T$
$K_7=[0.16659725113632, 0.00023144291728]^T$
$K_8=[0.15549681232540, 0.00018515638948]^T$
$K_9=[0.14540431489250, 0.00015149312056]^T$ By applying the vector K to recursions 4 and 5, the estimate $\hat{w}_n$ can be obtained and thus, the pair $[\theta_0, \omega_0]^T$ can be computed.

The state variables initialization module represented as PLL and NCO initialization module 250 uses the carrier frequency and phase offset estimates obtained from the curve fit algorithm module 240 to initialize the state variables of the PLL 100.

FIG. 3A illustrates the different components of the remove modulation module 220 shown in FIG. 2. The remove modulation module 220 comprises remove modulation logic 300 configured to communicate with one or more memory elements 301*a*, 301*b* and 301*c*. The operation of the remove modulation logic 300 shown in FIG. 3A can be readily understood from the flowchart shown in FIG. 3B. The remove modulation logic 300 estimates, for every received symbol, the angle rotation relative to a previous symbol caused by the channel distortion. The memory elements 301*a*, 301*b* and 301*c* are used to hold values of variables such as AccumRotation, FirstTimeFlag and State which are updated and carried from a previous symbol processing interval by the remove modulation logic 300 to a current symbol processing interval.

Although the remove modulation logic 300 is illustrated for a Binary Phase Shift Keying (BPSK) modulation implementation, this logic may be implemented for any two-dimensional modulation such as Multiple Phase Shift Keying (MPSK) or Multiple Quadrature Amplitude Modulation (M-QAM). For a BPSK implementation, the remove modulation logic 300 may be applied if the carrier frequency offset $f_0$ satisfies $f_0<1/(4T_s)$. For larger carrier frequency offsets, the phase shift from one symbol to another will exceed 90 degrees, which will make the determination as to whether the phase shift is due to the transmitted symbol or the carrier offset difficult. In general, for MPSK modulation, the modulation effect may be removed if the carrier frequency offset $f_0$ satisfies $f_0<1/(2MT_s)$. In a situation when $f_0$ does not satisfy the previous equation, a training sequence known to the receiver may be used to remove the indetermination given $f_0<1/(2T_s)$.

Figure 3B:
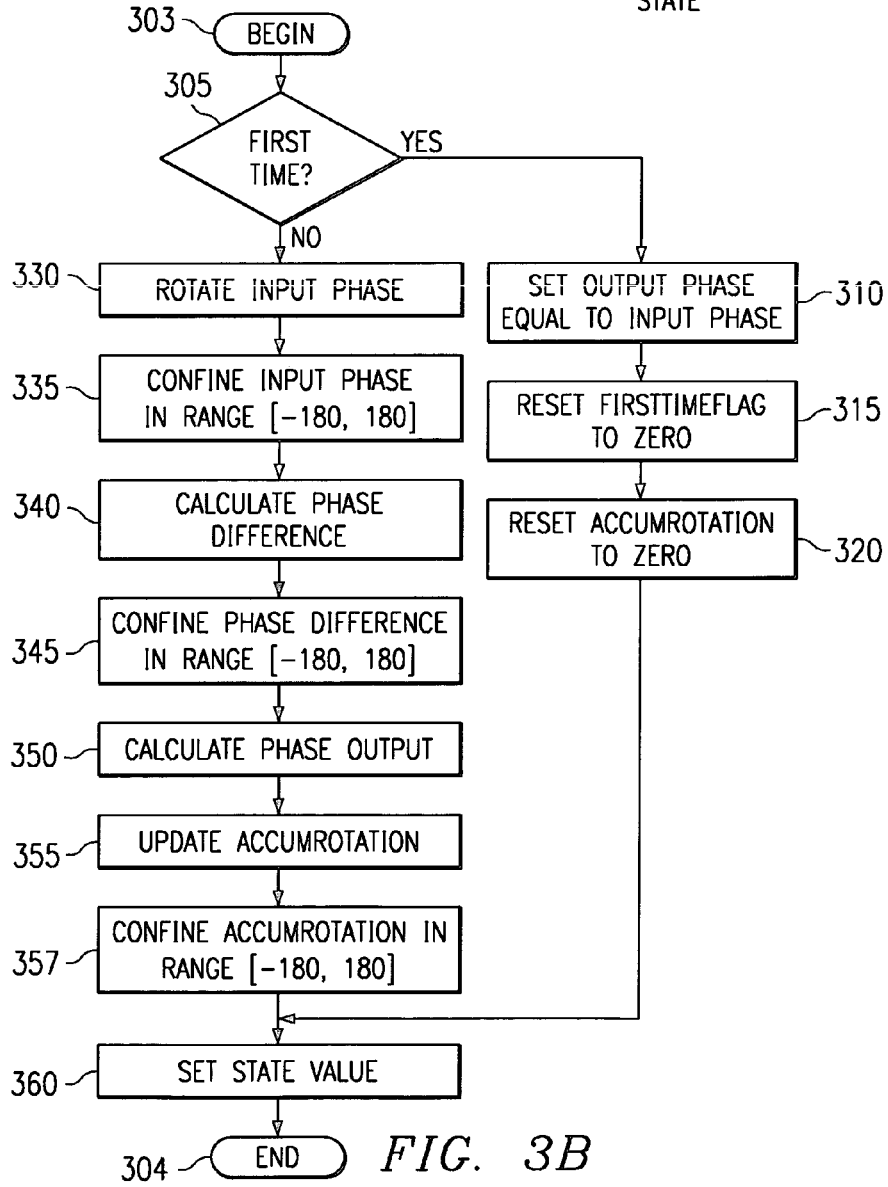

The flowchart of FIG. 3B illustrates the different steps performed by the remove modulation logic 300 in an example implementation. At the beginning of the function (step 303), a test is performed to determine if this is the first time the module is called (step 305). If the FirstTimeFlag variable is equal to one, the "Yes" branch is taken and the remove modulation module 220 sets the output phase equal to the input phase (step 310). At step 315 and step 320 the AccumRotation variable and the FirstTimeFlag variable are reset to zero.

If the FirstTimeFlag is equal to zero at the test step 305, the flowchart proceeds along the "No" branch to step 330. At step 330, the input phase value is rotated by adding to its value the value of the AccumRotation variable. At step 335 the rotated input phase value is confined, if necessary, to the range [−180°, 180°] by using software means, for example, a code written in MATLAB:

```
if θ₁ (n) > 180
    θ₁ (n) = θ₁ (n) − 360;
elseif θ₁ (n) < −180
    θ₁ (n) = θ₁ (n) + 360;
else
    θ₁ (n) = θ₁ (n);
end
```

At step 340, a phase difference between the rotated input phase value and the present state is calculated as exemplified by the MATLAB code:

TempPhase=θ₁(*n*)−State.

At step 345, the remove modulation logic 300 ensures that the phase difference, e.g., TempPhase, is confined in the range [−180°, 180°] by using, for example, the above described software means. The output phase is calculated at step 350 and the AccumRotation is updated at step 355. Step 350 and step 355 may be accomplished using a software means, such as the following MATLAB code:

```
if abs (TempPhase) > 90
    if (θ₁ (n) >= 0.0 ) & (θ₁ (n) <= 180)
        θ₂ (n) = θ₁ (n) − 180;
        AccumRotation = AccumRotation − 180;
    elseif (θ₁ (n) < 0.0) & (θ₁ (n) >= −180)
        θ₂ (n) = θ₁ (n) + 180;
        AccumRotation = AccumRotation + 180;
    end
else
    θ₂ (n) = θ₁ (n);
    AccumRotation = AccumRotation + 0.0;
end
```

At step 357, the AccumRotation is confined in the range [−180°, 180°] by similar software means to that described above.

As illustrated in FIG. 3B, before the remove modulation logic 300 terminates its operation at step 304, the present state variable is updated at step 360 by setting its value equal to the output phase.

Figure 4A:
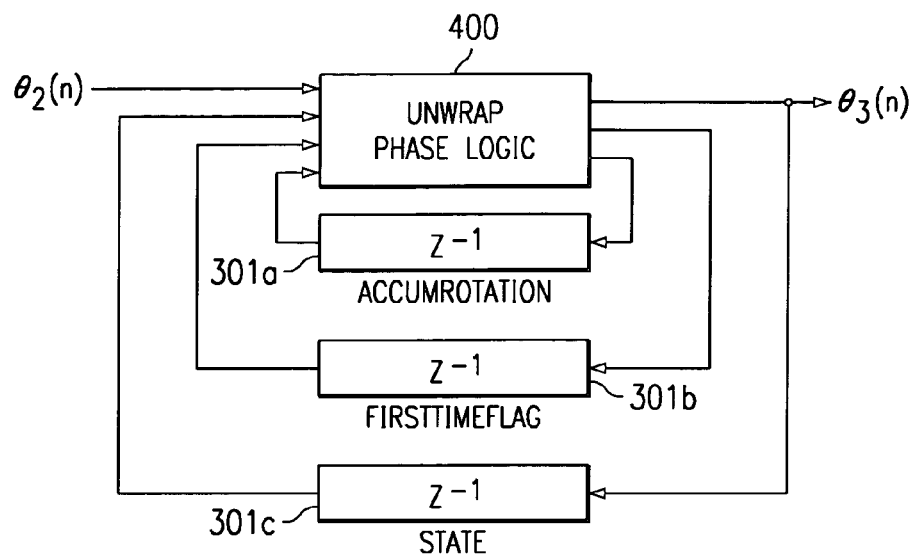
FIGS. 4A and 4B are a block diagram and flowchart, respectively, illustrating a phase unwrap module.

FIG. 4A illustrates the unwrap phase module 230 of FIG. 2. The unwrap phase module 230 contains an unwrap phase logic 400 whose operation is described by the flowchart shown in FIG. 4B. The unwrap phase logic 400 performs a modulo operation on the sequence of phase values received from the remove modulation module 220. As described by the flowchart of FIG. 4B, a bounded phase value θ₂(n) between [−180°, 180°] is converted to its absolute value which allows for a first-order polynomial representation of the sequence of phase values.

Figure 4B:
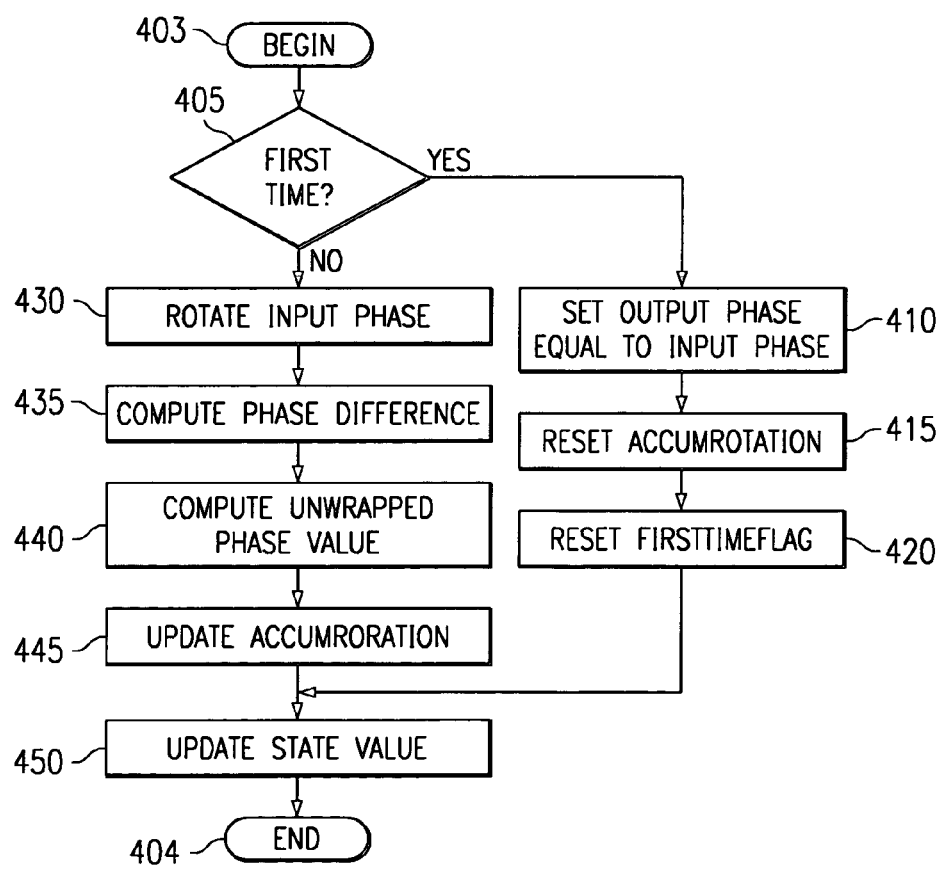

FIG. 4B illustrates a flowchart which can be used to implement the unwrap phase logic 400. The test step 405 determines if the FirstTimeFlag is equal to one, in which case the "Yes" branch is taken. If the FirstTimeFlag is equal to zero, the unwrap phase logic 400 proceeds along the "No" branch.

If the "yes" branch is taken, at step 410 the output phase is set equal to the input phase and at steps 415 and 420, the AccumRotation and the FirstTimeFlag are reset to zero.

If the "No" branch is taken, at step 430 a rotated phase value is computed by adding to the input phase value the value of AccumRotation. At step 435 a phase difference between the rotated phase value and the present state value is computed. Step 430 and step 435 may be accomplished using a software means such as the following MATLAB code:

θ₂(*n*)=θ₂(*n*)+AccumRotation;

DeltaTheta=θ₂(*n*)−State;

At step 440, the unwrapped phase value is computed and at step 445 the AccumRotation value is updated. Step 440 and step 445 may be implemented using the following exemplary software means written in MATLAB:

```
        if ( abs (DeltaTheta + 360) < abs (DeltaTheta) )
             θ₃ (n) = θ₂ (n) + 360;
             AccumRotation = AccumRotation + 360;
          elseif ( abs (DeltaTheta - 360) <
abs(DeltaTheta) )
             θ₃ (n) = θ₂ (n) - 360;
             AccumRotation = AccumRotation - 360;
          else
             θ₃ (n) = θ₂ (n);
             AccumRotation = AccumRotation + 0.0;
          end
      end
```

At step 450, the present state value is updated and the process ends at step 404.

Figures 5, 6:
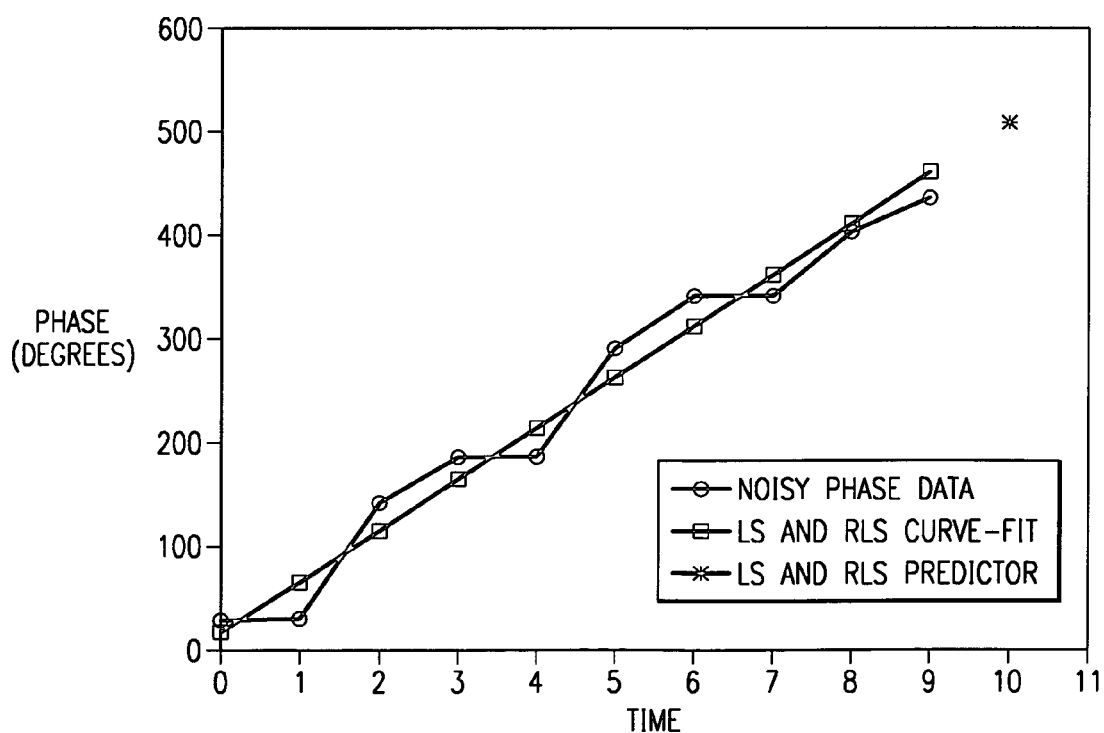
FIG. 5 is a table of phase values at the output of each module of the PLL initialization module.
FIG. 6 illustrates the performance of methods and apparatus in accordance with the present invention in graphical form.

FIG. 5 shows a table 500 containing phase values generated by different modules of the PLL initialization module 200. Table 500 also shows a sequence of transmitted bits (column 502) as well as the transmitted symbols, i.e., "constellation points" (column 504) and the received symbols (column 506). Column 508 contains the phase values generated by the phase module 210 of FIG. 2. Column 510 contains the phase values generated by the remove modulation module 220 of FIG. 2. Column 512 contains the phase values generated by the unwrap phase module 230 of FIG. 2.

FIG. 6 illustrates an exemplary curve obtained by applying the curve fitting algorithim to a sequence of phase values $\theta_3(n)$. As shown in FIG. 6, ten input phase values are used to predict the eleventh phase value which is expressed linearly as a function of the carrier phase offset estimate $\theta_0=34°$ and the carrier frequency offset estimate $\dot{\theta}_0=1/(8T_s)$ as previously described. The noisy phase data represent the input phase values, the LS and RLS curve-fit represents the straight line approximation of the noisy data, and the LS and RLS predictor is the predicted value obtained by using the RLS method.

Use of a digital processing algorithm to estimate the initial values of the state variables of the PLL allows reducing the acquisition time by providing an accurate estimate of the carrier frequency offset and the carrier phase offset. The method of the present invention may be implemented in a number of different ways including software, hardware or a combination thereof. It can be implemented as embedded software in a Digital Signal Processor (DSP) or implemented as an Application Specific Integrated Circuit (ASIC). Other implementation methods may also be used.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for estimating carrier frequency and phase offsets of a digitally modulated signal, comprising:
   (a) estimating one or more phases of a sequence of digitally modulated symbols;
   (b) removing from each of the estimated phases an angle rotation introduced by a modulation format, wherein the rotation is determined based on a reference symbol;
   (c) deriving a set of values from the estimated phases after removal of said angle rotation, wherein said values are a function of the carrier frequency and phase offsets to be estimated;
   (d) processing said values to determine estimates of the carrier frequency and phase offsets; and
   (e) initializing the parameters of a Phase-Locked Loop with the estimated carrier frequency and the phase offsets.

2. The method of claim 1 wherein step (c) uses an unwrap phase function to derive said set of values.

3. The method of claim 1 wherein the processing of step (d) uses an estimation algorithm based on the recursive least-squares method.

4. The method of claim 1 wherein the processing of step (d) uses an estimation algorithm based on the Kalman filtering method.

5. The method of claim 1 wherein the processing of step (d) uses an estimation algorithm based on the least-mean squares method.

6. A method for recovering a carrier phase offset and a carrier frequency offset comprising the steps of;
   (a) receiving a modulated signal containing a plurality of symbols;
   (b) determining an angular location of first symbol;
   (c) determining an angular location of a second symbol;
   (d) removing the modulation from the second symbol to produce an unmodulated angular sequence; and
   (e) estimating the carrier phase and frequency offsets by curve fitting the unmodulated angular sequence.

7. The method described in claim 6 further comprising the step of:
   (f) unwrapping the unmodulated angular sequence to compensate for phase discontinuities.

8. The method of claim 6 wherein step (e) is based on the recursive least-squares method to perform the curve-fitting.

9. The method of claim 6 wherein step (e) is based on the Kalman filtering method to the curve-fitting.

10. The method of claim 6 wherein step (e) is based on the least-mean squares method to perform the curve-fitting.

11. The method of claim 6 wherein the carrier phase offset and the carrier frequency offset are used as initialization parameters in a phase-locked loop.

12. An apparatus for estimating a carrier phase offset and a carrier frequency offset, comprising:
   (a) a phase calculator for estimating phases of a sequence of digitally modulated symbols;
   (b) a remove modulation module for removing an angle rotation introduced by a modulation format to generate a sequence of phase values representative of the carrier frequency offset and the carrier phase offset;
   (c) an estimation module for estimating the carrier frequency offset and the carrier phase offset, whereby the estimation module applies a curve-fitting algorithm to the sequence of phase values to generate a linear function dependent of the crier frequency offset and the carrier phase offset; and
   (d) an unwrap module for converting the phase estimates generated by the phase calculator module into absolute values.

13. The apparatus of claim 12, further coupled to a phase-locked loop to initialize the phase-locked loop with the estimates of the carrier frequency offset and the carrier phase offset.

14. The apparatus of claim 12, wherein the estimation module applies a curve-fitting algorithm to the sequence of phase values to estimate the carrier frequency offset and the carrier phase offset.

* * * * *